April 9, 1946. K. D. BULL 2,397,943
SYNCHRONIZING MECHANISM
Filed March 2, 1942 4 Sheets-Sheet 2
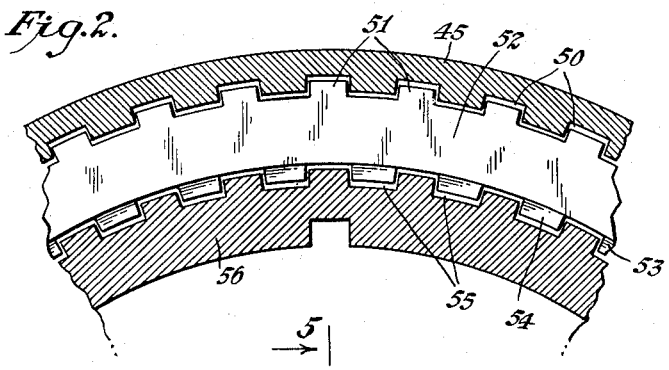
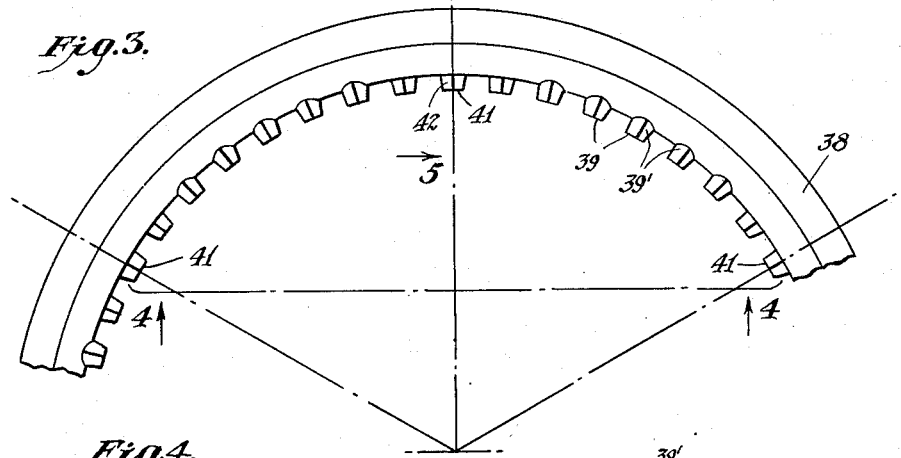
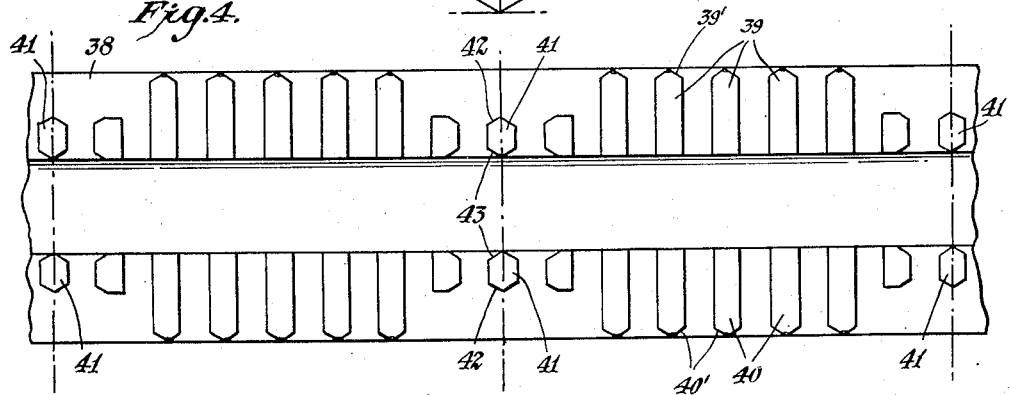
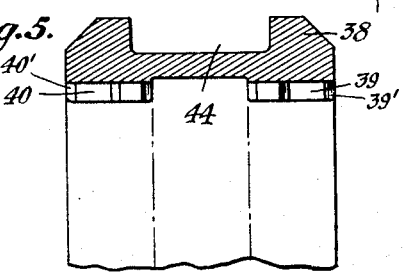
INVENTOR
KENNETH D. BULL April 9, 1946.　　　　K. D. BULL　　　　2,397,943
SYNCHRONIZING MECHANISM
Filed March 2, 1942　　　4 Sheets-Sheet 3
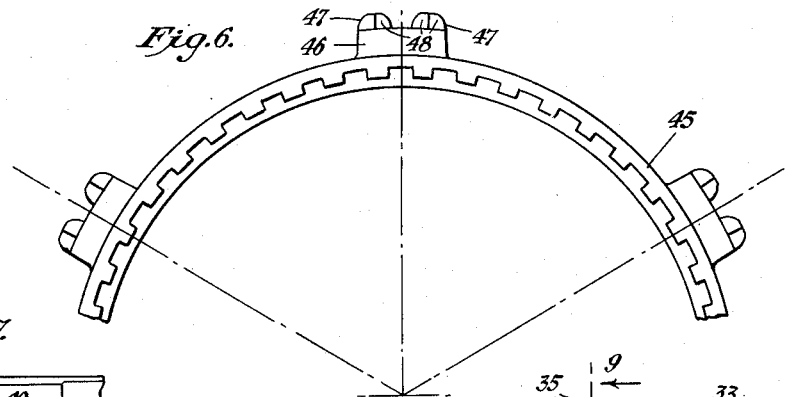
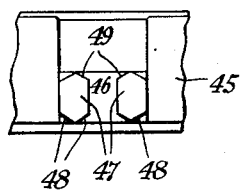
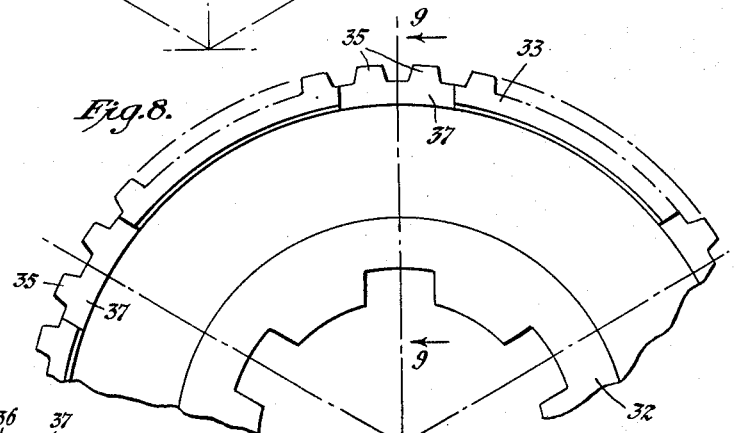
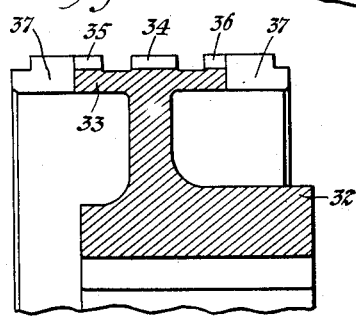
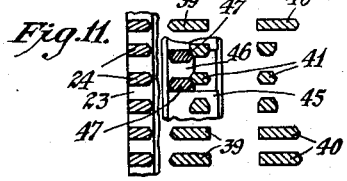
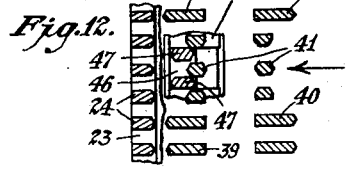
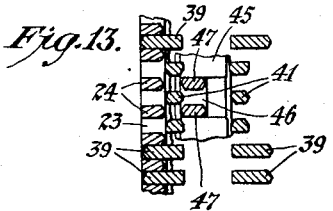
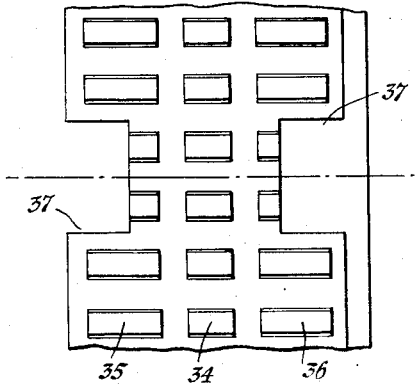
INVENTOR
KENNETH D. BULL
BY
ATTORNEY

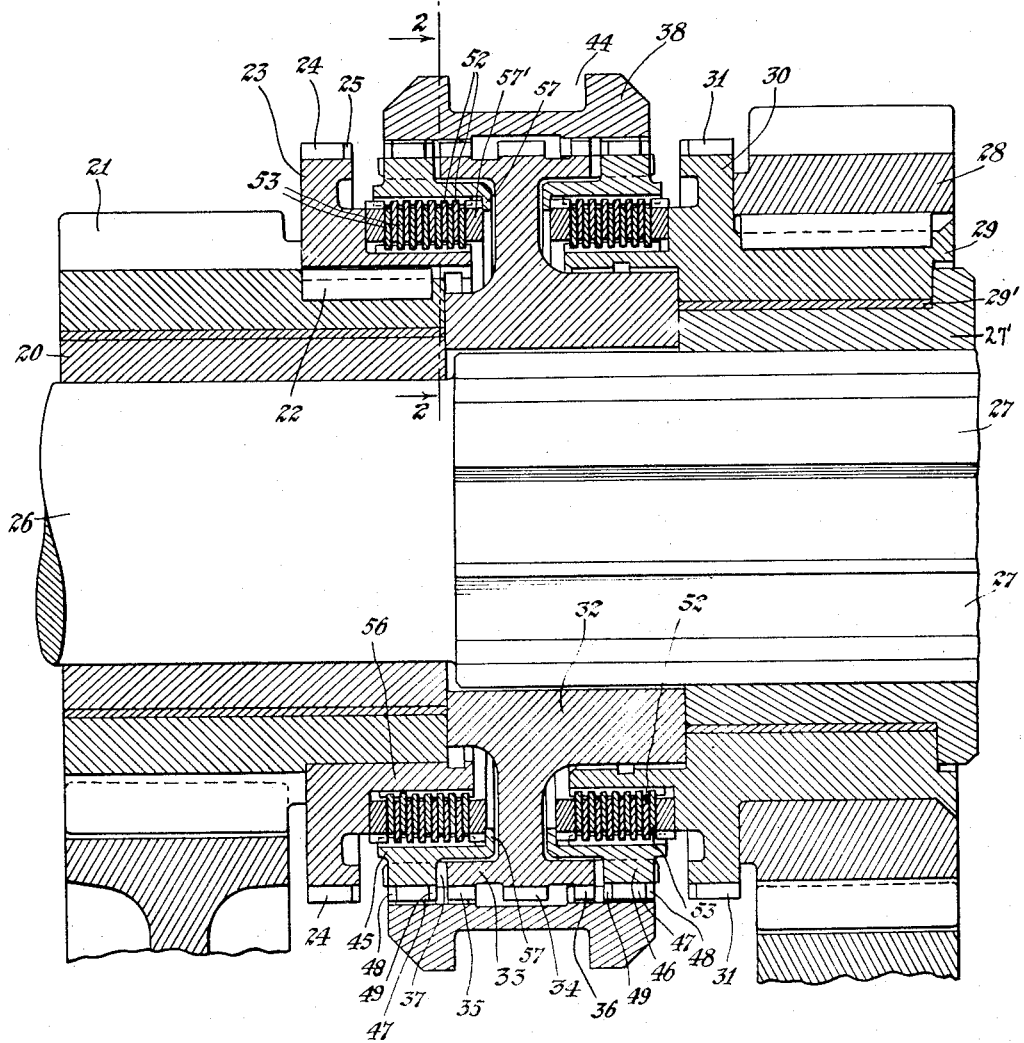

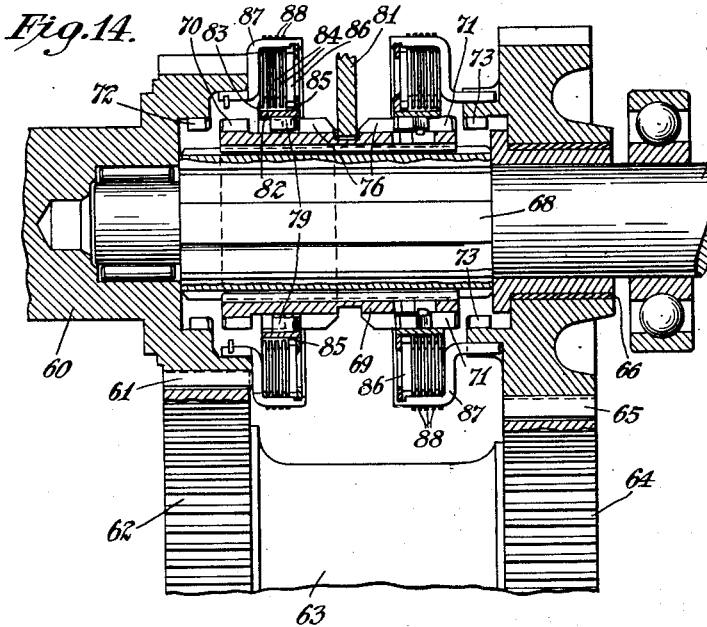

Patented Apr. 9, 1946

2,397,943

UNITED STATES PATENT OFFICE 2,397,943

SYNCHRONIZING MECHANISM

Kenneth D. Bull, Middlesex, N. J., assignor to Mack Manufacturing Corporation, Long Island City, N. Y., a corporation of Delaware Application March 2, 1942, Serial No. 433,004

6 Claims. (Cl. 192—53)

The present invention relates to synchronizing mechanisms and embodies, more specifically, an improved synchronizing mechanism for use in connection with multi-speed transmission devices such, for example, as motor vehicle transmissions.

The progress of the development of the so-called "synchromesh" transmission devices is generally well known and, in one form of these devices that is in common use, a balking mechanism is utilized to prevent the engagement of the positive drive clutch elements until they have been brought into synchronism. An illustration of such a mechanism is found in the patent to Manville No. 2,259,527 and, in order that the balking mechanism may be normally effective to exert a balking action upon the movable clutch member, such member must be subjected to a constant force tending to maintain it in a balking position. In the form of devices illustrated in the foregoing patent, the balking member is maintained in positive frictional engagement with the rotating clutch member by means of a spring.

An object of the present invention is to provide a synchronizing mechanism of a character having a positive balk element wherein the balking element is maintained in a balking position in a new and highly effective manner.

A further object of the invention is to provide a device of the above character wherein the forces utilized to maintain the balking element in normal balking position are such that, although they function effectively to maintain the balking element in balking position, they do not substantially impair the efficiency of the mechanism nor do they subject the elements thereof to objectionable wear.

More particularly, the foregoing objects are attained in a mechanism wherein the relatively rotating clutch members are provided with surfaces between which there is maintained a film of a suitable medium by means of which a frictional drag is constantly impressed upon the balking element. More particularly, the structure contemplates the use of interspaced friction discs mounted respectively upon one of the clutch elements and the balking element, between the surfaces of which disc there is maintained an oil film to subject the balking member to a continuous frictional drag during relative rotation between the clutch elements.

Further objects of the invention will be apparent as it is described in further detail in connection with the drawings, wherein:

Fig. 1 is a view in section, taken in a plane passing through the axis of the clutch mechanism and showing the balk mechanism of the present invention.

Fig. 2 is a segmental view in section, taken on the line 2—2 of Fig. 1 and looking in the direction of the arrows.

Fig. 3 is a segmental view in end elevation, showing the details of the slidable clutch member.

Fig. 4 is a diagrammatic illustration of the inner portion of the slidable member shown in Fig. 3, the elements thereof being projected and shown in a common plane, the view looking in the direction of the arrows 4—4 of Fig. 3.

Fig. 5 is a view, in section, taken on the line 5—5 of Fig. 3 and looking in the direction of the arrows.

Fig. 6 is a view similar to Fig. 3, showing the balking member of the present invention.

Fig. 7 is a segmental plan view of the portion of the balking member that is formed with balking teeth.

Fig. 8 is a segmental view in end elevation, showing the hub upon which the slidable clutch member is mounted.

Fig. 9 is a view, in section, taken on the line 9—9 of Fig. 8 and looking in the direction of the arrows.

Fig. 10 is a plan view of a portion of the surface of the hub member shown in Fig. 9, the parts being projected into a common plane for the purpose of illustration.

Fig. 11 is a diagrammatic view showing the normal position of the elements when the clutch elements are disengaged and are running at different speeds.

Fig. 12 shows the manner in which the balking elements are displaced when the clutch elements are brought into synchronous speed in order that the movable clutch element may move into engagement with the axially fixed clutch element.

Fig. 13 is a further view, showing the position of the elements when they are engaged.

Fig. 14 is a view similar to Fig. 1, showing a modified form of the invention.

Fig. 15 is a view in side elevation, partly broken away and in section, showing the slidable clutch element of Fig. 14.

Fig. 16 is an end view of the slidable clutch element shown in Fig 15.

Fig. 17 is a diagrammatic illustration of the position of the blocking teeth and positive clutch elements during normal operation and when the clutch elements are running at different speeds.

Fig. 18 is a view similar to Fig. 17, showing the manner in which the synchronization is accomplished and the balking member displaced.

Fig. 19 is a view similar to Fig. 17, showing the positive clutch elements in engagement.

Figures 20 to 23 disclose a modified form of balking arrangement in positions corresponding to the position of the balking elements disclosed in Figures 15 and 17 to 19 respectively.

Referring to the form of invention shown in Figs. 1 to 13, a drive shaft 26 is shown as being provided with splines 27 upon which a hub 32 is received. The drive shaft 26 is provided with a boss 20 to form a bearing upon which driven gear 21 is journaled. In like manner, a spline section 27 carries a sleeve 27' upon which a sleeve 29 is journaled at 29'. The sleeve 29 has splined thereto a driven gear 28.

Upon the driven gear 21 a clutch plate 23 is splined, as illustrated at 22, the plate 23 having clutch teeth 24 formed thereon, and the leading sides of the teeth 24 being chamfered at 25 in order to facilitate engagement of mating teeth therewith.

The sleeve 29 is formed with a clutch plate 30 having clutch teeth 31 formed similarly to teeth 24.

The hub 32 is formed with a cylindrical mounting member 33, the cylindrical surface of which is provided with an intermediate series of teeth 34 and spline teeth 35 and 36, upon opposite sides of the teeth 34. Teeth 34 prevent disengagement of the sleeve 38 and hub 32 and the cylindrical member 33 is notched as illustrated at 37 to receive companion elements 46 of the balking mechanism presently to be described.

A slidable clutch sleeve 38 is formed with teeth 39 and 40 on the inner periphery thereof, as illustrated in Figs. 3 and 4. The leading edges of these teeth are chamfered as illustrated at 39' and 40' to facilitate engagement thereof with the respective teeth 24 and 31. Between the series of teeth 39 and 40 balk actuator teeth 41 are formed, the function of which will appear hereinafter. The ends of the teeth 41 are chamfered as illustrated at 42 and 43, in order to facilitate movement of the sleeve 38 and also to accomplish the desired operation of the balking mechanism as hereinafter described. Sleeve 38 is formed with a peripheral groove 44 in order that the sleeve may be moved axially by a suitable yoke in a manner well understood.

Mounted within the cylindrical portion 33, upon each side thereof, is a balk ring 45 having radially extending lugs 46 formed thereon, the ends of which lugs are formed with balk teeth 47. The ends of the teeth 47 are chamfered as illustrated at 48 and 49 in order to accomplish the synchronization of the relatively rotating clutch elements and then, after synchronization, permit the interengagement thereof. The lugs 46 are received within the recesses 37 and, being smaller in a circumferential direction than the corresponding dimension of the recesses 37, a certain freedom of rotating movement is provided between the balk rings and the cylindrical member 33. This movement is sufficient to enable the teeth 47 to be moved from a balking position to a non-balking position so that the movable clutch sleeve 38 may be moved in either direction to engage the appropriate clutch teeth.

In order that the teeth 47 may be maintained normally in a balking position, the inner surface of each of the rings 45 is formed with grooves 50 to receive teeth 51, formed on a series of clutch plates 52. Interleaved between the clutch plates 52 are a similar series of clutch plates 53 having teeth 54 thereon. The teeth 54 are received in grooves 55 formed on an extension 56 of each of the clutch plates 23 and 30. The balk rings 45 are preferably formed with an inwardly extending flange 57 through which the synchronizing forces may be exerted upon the friction plates.

From the foregoing, it will be apparent that the operation of the mechanism is as follows:

In the normal condition of operation when the speed of rotation of the shaft 26 differs from the speed of rotation of either of the hollow gears 21 or 28, the balk teeth 41 are in the position illustrated in Figs. 1 and 11. In this position, movement of the sleeve 38 in either direction will be prevented because of the engagement of teeth 41 with the teeth 47. It will be apparent that the chamfered surfaces 42 will engage the chamfered surfaces 49 so that, when pressure is exerted axially upon the sleeve 38, it will be transmitted through these chamfered surfaces and the balk ring 45 to the flange 57 and a backing plate 57'. The result will be that the friction discs 52 and 53 will be engaged to bring the clutch elements into synchronism. At this point, the movement of the teeth 47 with respect to the teeth 41 will be permitted, such movement being along the chamfered surfaces 49 and 42. This is illustrated in Fig. 12 of the drawings. Continued movement, as aforesaid, will move the balking teeth 47 into the position shown in Fig. 13, at which time the teeth 41 are permitted to pass between the balking teeth so that the clutch teeth 39 may engage the teeth 24. As aforesaid, the chamfered ends 25 and 39' facilitate this engagement.

The driving forces are thus transmitted from the drive shaft 26 through the splines 27, hub 32, clutch sleeve 38 or clutch teeth 24 and 31 to either of the driven gears 21 or 28.

The elements are so formed that a running clearance is normally permitted between the clutch discs. This clearance affords a space for an oil film so that, during normal operation, the frictional drag, due to the oil film, maintains the balk teeth 47 in the balking position illustrated in Fig. 11. This accomplishes effectively the maintaining of the balk ring in a normal balking position without subjecting the elements to objectionable wear.

In the form of the invention shown in Figs. 14 to 19, the drive shaft 67 is splined at 68 to receive a slidable clutch member 69. The slidable clutch member is formed with clutch teeth 70 and 71 that are adapted to engage respectively with teeth 72 and 73 formed upon driven gears 61 and 65. A driven countershaft is illustrated at 63 as formed with gears 62 and 64 that engage respectively with gears 61 and 65, thus permitting the countershaft to be driven by either of the gears 61 or 65.

The slidable clutch member is also formed with lugs 74 having tapered surfaces 75 and a series of splines 76 that are interrupted at 77. The splines 76 are formed with tapered leading edges 78 which, with the tapered surfaces 75, form recesses within which balk teeth 79 are received. The balk teeth 79 are formed with tapered surfaces 80 that are adapted to be engaged by the surfaces 78, as illustrated in Fig. 17, so that, when the relatively rotating clutch teeth have been brought into synchronous rotation, further axial pressure and motion of the sliding clutch member 69 may force the teeth 79 into the position shown in Fig. 18 in order that the slidable clutch teeth 70 may move into engagement with teeth 72 as illustrated in Fig. 19. The foregoing axial movement of the slidable clutch member 69 may be effected by means of a yoke 81.

Balk teeth 79 are formed upon a balk ring 82 which is provided with one or more axially extending ribs 83 upon which a series of friction discs 84 are mounted. The rings 82 are formed with peripheral flanges 85 and a backing plate 86 in order that the friction discs may be urged together under pressure by axial forces exerted upon the slidable clutch member 69.

Upon each of the gears 61 and 65, spiders 87 are mounted, these spiders carrying a plurality of friction discs 88 that are spaced between the respective friction discs 84. In this fashion, axial pressure exerted upon the friction discs by the backing plate 85 will produce friction that will bring the relatively rotating clutch elements into synchronous rotation.

During normal operation, sufficient clearance is provided between the friction discs 84 and 88 to permit free rotation therebetween, constant frictional drag being provided by means of a film of oil that will normally be maintained between the discs. In this fashion, the balk teeth 79 are maintained in a constant balking position and inadvertent engagement cannot be effected without first synchronizing the respective clutch teeth.

It will be observed that, in the structure shown in Figs. 14 to 19, the friction discs are provided outside radially of the slidable sleeve 69, whereas in the structure shown in Figs. 1 to 13, the friction discs are mounted inside the plane of the clutch teeth.

The structure shown in Figures 20 to 23 illustrates the manner in which the invention may be embodied in a slightly different form that operates on identical principles but differs because of different manufacturing problems that arise. As illustrated in Figures 20 to 23, the balk teeth 79' are of slightly different shape but cooperate with the spline 76' in the same manner as the teeth 79 cooperate with the spline 76 in Figures 15 and 17 to 19 in order to balk the shifting operation of the sleeve 69' to the right prior to the engagement of the teeth 71' with the teeth of the cooperating clutch element. Other parts corresponding to the numbered parts disclosed in Figures 15 and 17 to 19 are identified in Figures 20 to 23 by corresponding primed reference numerals.

It will be observed that an oil drag may be set up to maintain the blocking means in a normal blocking position by means other than by providing for the drag between the friction plates. For example, drag surfaces could be provided on any elements that are more remotely connected to the relatively rotating elements to accomplish the desired results.

While the invention has been described with specific reference to the structures shown in the accompanying drawings, it is not to be limited save as defined in the appended claims.

I claim:

1. In a synchronizing mechanism, the combination of a pair of clutch elements relatively shiftable into and out of power transmitting engagement, a first synchronizing member connected to one of said clutch elements and having a plurality of friction discs secured thereto with provision for axial movement with respect thereto, a second synchronizing member connected to the other of said clutch elements with provision for a degree of rotative movement with respect thereto, said second synchronizing member having a plurality of friction discs secured thereto with provision for axial movement with respect thereto and interspaced between the first named discs and adapted to coact therewith, a flange and backing plate on said second synchronizing member adapted to apply pressure to said discs, means on said second synchronizing member movable to positions for blocking and allowing shifting of a clutch element, said synchronizing members being formed normally to maintain said friction discs spaced apart a distance sufficient for an oil film to be maintained therebetween, thereby to establish a drag between the surfaces to maintain the blocking means in a normal blocking position.

2. In a synchronizing mechanism, the combination of a pair of clutch elements relatively shiftable into and out of power transmitting engagement, a first synchronizing member having a spider secured thereto radially remote from the clutch elements to mount friction discs thereon with provision for slidable but non-rotatable movement with respect thereto, a plurality of friction discs slidably mounted on the last named means, a second synchronizing member having a cylindrical portion formed thereon radially inwardly of the spider, friction discs on the cylindrical portion spaced between the first named friction discs, means to connect the second synchronizing member to the other of the said clutch elements with provision for a degree of rotative movement with respect thereto, means on said second synchronizing member movable to positions for blocking and allowing shifting of a clutch element, said synchronizing members being formed normally to maintain said friction discs spaced apart a distance sufficient for an oil film to be maintained therebetween, thereby to establish a drag between the friction discs to maintain the blocking means in a normal blocking position.

3. In a synchronizing mechanism, the combination of a pair of spaced clutch elements having teeth thereon, a central clutch element located between said spaced clutch elements and having oppositely disposed teeth thereon, said central clutch element being shiftable in opposite directions from a central position to bring said oppositely disposed teeth into power transmitting engagement with either one or the other of said spaced clutch elements, synchronizing means connected to said central and spaced clutch elements and including a first synchronizing member having a friction surface and rotatively fixed to that one of said clutch elements to which it is connected, a second synchronizing member having a friction surface positioned to coact with the friction surface on the first synchronizing member and connected to the other of said clutch elements with provision for a degree of rotative movement with respect thereto, means on the second synchronizing member movable to positions for blocking and allowing shifting movement of the central clutch element, block engaging means movable with the central clutch element and engageable with the blocking means, said friction surfaces, blocking means and block engaging means all being located between planes passing through the extremities of the oppositely disposed teeth on the central clutch element, and means to impose a drag on one of the synchronizing members to maintain the blocking means in normal blocking position with respect to the block engaging means.

4. In a synchronizing mechanism, the combination of a pair of clutch elements having cooperating teeth thereon, one of said elements being relatively shiftable into and out of power transmitting engagement with the other, a first synchronizing member connected to one of said clutch elements and having a plurality of friction discs secured thereto with provision for axial movement with respect thereto, a second synchronizing member connected to the other of said clutch elements with provision for a degree of rotative movement with respect thereto, said second synchronizing member having a plurality of friction discs secured thereto with provision for axial movement with respect thereto and interspaced between the first named discs and adapted to coact therewith, means on said second synchronizing member movable to positions for blocking and allowing shifting of the shiftable clutch element, block engaging means connected to the latter clutch element to engage the blocking means, and means on said synchronizing members for retaining said friction discs against axial movement beyond a distance sufficient for an oil film to be maintained therebetween, thereby to establish a drag between the surfaces to maintain the blocking means in a normal blocking position with respect to said block engaging means.

5. In a synchronizing mechanism, the combination of a pair of clutch elements having cooperating teeth thereon, one of said elements being relatively shiftable into and out of power transmitting engagement with the other, a first synchronizing member having a splined cylindrical sleeve secured thereto radially inwardly of the clutch elements, a plurality of friction discs mounted thereon with provision for slidable but non-rotatable movement with respect thereto, a second synchronizing member spaced inwardly of the clutch elements and formed with a splined cylindrical portion, said second member lying between the said cylindrical sleeve and the clutch teeth on the shiftable element, friction discs on the splined cylindrical portion of the second member and spaced between the first named friction discs, means to connect the second synchronizing member to the other of the said clutch elements with provision for a degree of rotative movement with respect thereto, means on said second synchronizing member movable to positions for blocking and allowing shifting of the shiftable clutch element, and means on said synchronizing members for retaining said discs against slidable movement beyond a distance sufficient for an oil film to be maintained between said discs, thereby to establish a drag between said discs to maintain the blocking means in a normal blocking position.

6. In a synchronizing mechanism, the combination of a pair of clutch elements relatively shiftable into and out of power transmitting engagement, a first synchronizing member connected to one of said clutch elements and having a plurality of friction discs secured thereto at least one of which is movable axially relatively to said first synchronizing member, a second synchronizing member connected to the other of said clutch elements with provision for a degree of rotative movement with respect thereto, said second synchronizing member having a plurality of friction discs secured thereto at least one of which is movable axially relatively to said second synchronizing member and interspaced between the first named discs and adapted to coact therewith, a flange and backing plate on said second synchronizing member adapted to apply pressure to said discs, means on said second synchronizing member movable to positions for blocking and allowing shifting of a clutch element, said synchronizing members being formed normally to maintain said friction discs spaced apart a distance sufficient for an oil film to be maintained therebetween, thereby to establish a drag between the surfaces to maintain a blocking means in a normal blocking position.

KENNETH D. BULL.